(12) United States Patent
Hidding et al.

(10) Patent No.: US 11,225,361 B2
(45) Date of Patent: Jan. 18, 2022

(54) BEVERAGE CAP

(71) Applicant: BLACKHAWK MOLDING CO., INC., Addison, IL (US)

(72) Inventors: Douglas J. Hidding, Barrington, IL (US); Jeffrey S. Davis, DeKalb, IL (US); Thomas M. Urie, Villa Park, IL (US)

(73) Assignee: BLACKHAWK MOLDING CO., INC., Addison, IL (US)

( * ) Notice: Subject to any disclaimer, the term of this patent is extended or adjusted under 35 U.S.C. 154(b) by 161 days.

(21) Appl. No.: 16/168,711

(22) Filed: Oct. 23, 2018

(65) Prior Publication Data
US 2020/0122899 A1  Apr. 23, 2020

(51) Int. Cl.
*B65D 41/04* (2006.01)
*B65D 41/34* (2006.01)
*B29C 45/00* (2006.01)
*B29K 23/00* (2006.01)

(52) U.S. Cl.
CPC ...... *B65D 41/0414* (2013.01); *B29C 45/0001* (2013.01); *B65D 41/3423* (2013.01); *B29K 2023/12* (2013.01); *B65D 2251/023* (2013.01)

(58) Field of Classification Search
CPC .... B65D 41/04; B65D 41/34; B65D 41/0414; B65D 41/3423; B65D 41/3428; B65D 2251/023; B29C 45/0001; B29K 2023/12
USPC .......................... 215/252, 256, 901; 220/296
See application file for complete search history.

(56) References Cited

U.S. PATENT DOCUMENTS

| | | | | |
|---|---|---|---|---|
| 5,782,369 A | * | 7/1998 | Tansey | B65D 41/0428 215/252 |
| 6,581,792 B1 | * | 6/2003 | Limanjaya | B65D 41/3428 215/252 |
| 7,832,577 B2 | * | 11/2010 | Shingle | B65D 41/0421 215/217 |
| 8,689,990 B2 | * | 4/2014 | Hdeyasu | B65D 53/04 215/350 |
| 2001/0027957 A1 | * | 10/2001 | Kano | B65D 41/0421 215/341 |
| 2015/0129534 A1 | * | 5/2015 | Falzoni | B65D 41/0421 215/316 |

* cited by examiner

*Primary Examiner* — James N Smalley
*Assistant Examiner* — Elizabeth J Volz
(74) *Attorney, Agent, or Firm* — Baker & McKenzie

(57) ABSTRACT

A closure for a container includes a cap connected to a retaining ring. The cap includes a cover and a skirt. A plurality of concentric threads are disposed on an inside surface of the skirt. The plurality of threads includes at least a first thread at a first level and a second thread at a second level. The first thread is comprised of at least a first thread segment separated from a second thread segment by a first space. The second thread is comprised of at least a third thread segment separated from a fourth thread segment by a second space. A plurality of latch segments includes a first latch segment separated from a second latch segment by a third space. The first space, the second space, and the third space at least partially overlap in along a radial direction of the cap to provide a flex point.

10 Claims, 5 Drawing Sheets

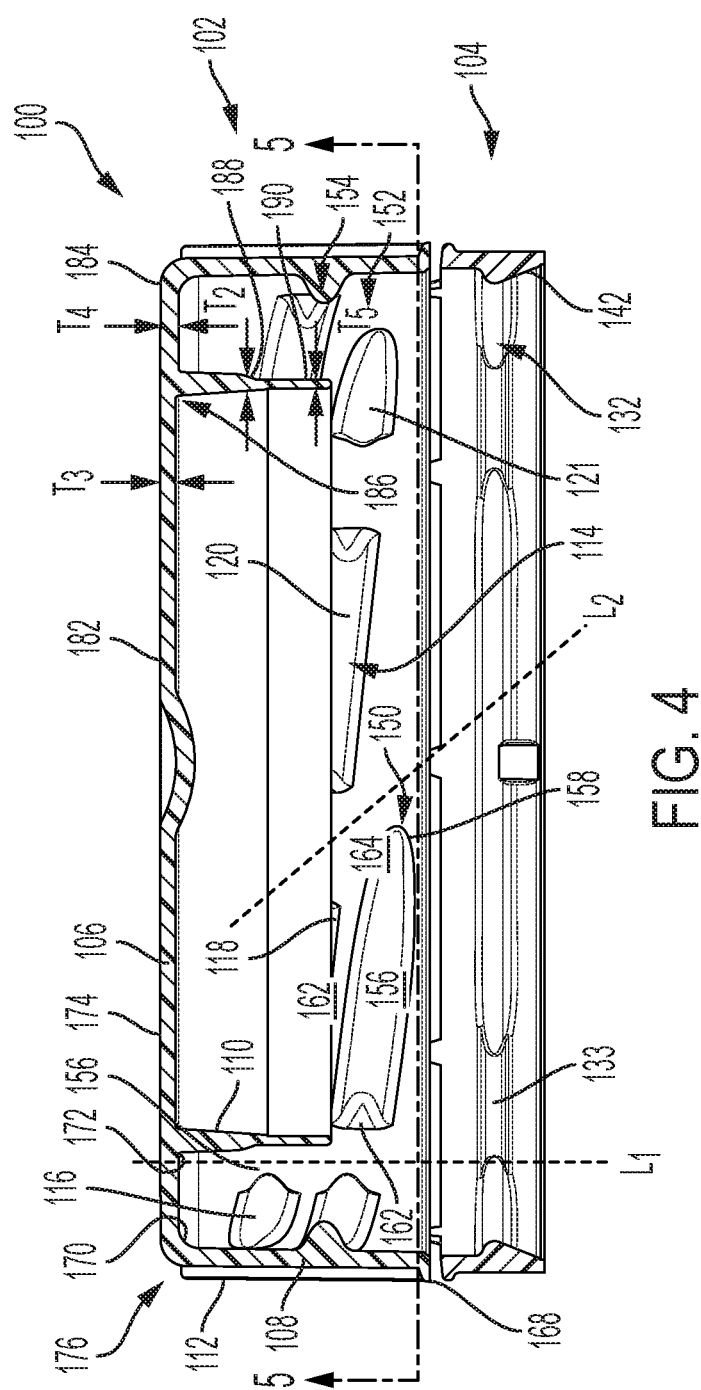

BEVERAGE CAP

CROSS-REFERENCE TO RELATED APPLICATIONS

U.S. patent application Ser. No. 13/721,862 is incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

TECHNICAL FIELD

The embodiments described herein relate generally to closures for containers, and in particular to a high density polyethylene (HDPE) cap with various features that allow it to have similar characteristics as prior art low density polyethylene (LDPE) caps.

BACKGROUND

The beverage market has under gone a steady transition with each new generation of packaging being developed using a lighter and lighter bottle design. This process continued with the closures becoming smaller and smaller. These changes required significant changes to the bottler's equipment along with the corresponding required investment.

The present embodiments present a complete rethinking of this process. By keeping the key dimensional features of current caps, the need for changes to the bottlers equipment can be eliminated. At the same time, by redesigning the internal features of the closure to achieve what used to require a new cap and/or bottle design, a significantly lighter closure will result. More particularly, by thinning out the closure walls, interrupting the threads, modifying the closure "corner", adding ramps and a plug "rudder," an HDPE closure results that works in a market previously completely dependent on LDPE and LLDPE closures. Because HDPE is significantly stiffer than LDPE and/or LLDPE, the features of the present embodiments "lightweight" the closure and result in a closure with nearly identical field performance to current market closures. And, because the cap is lighter and because the market price is significantly lower for HDPE resin versus LDPE or LLDPE resin, the present embodiments provide a more cost effect closure to the market place while at the same time providing a significant improvement in the carbon footprint of the project. In addition, HDPE allows for a significant improvement in cycle time, further improving cost profile and carbon footprint.

BRIEF SUMMARY

The embodiments described herein relate generally to closures for containers, and in particular relate to features that allow an HDPE closure to perform like a LDPE closure. In one embodiment, the closure includes a cap connected to a retaining ring, where the cap include a cover and a skirt. There are a plurality of concentric threads disposed on an inside surface of the skirt, where each of the plurality of threads are presented at different levels. Each of the threads are made up of a plurality of spaced thread segments. The retaining ring includes a latch that is disposed on an inside surface of the retaining ring, where the latch is made up of a plurality of spaced-apart latch segments. At various radials around the circumference of the closure, the spaces between the thread segments and latch segments will align to present a flex point for the closure that extends from the bottom of the closure to the top of the closure.

In another embodiment, the closure includes a cap having a cover and a skirt. A plurality of concentric threads are disposed on an inside surface of the skirt, where the plurality of threads include at least a first thread at a first level and a second thread at a second level that is above the first level. The first thread includes at least a first thread segment having a first start point and a first stop point, and the second thread includes at least a second thread segment having a second start point and a second stop point. The second thread segment is positioned above and at least partially overlaps the first thread segment along a radial of the cap. To provide flexibility to the closure, at least one of the first start point and the first stop point of the first thread segment are at a different radial than the second start point and the second stop point of the second thread segment, respectively.

In yet another embodiment, the closure includes a cap having a cover and a skirt. A plurality of knurls are disposed on an outside surface of the skirt, where the top of the plurality of knurls are disposed below a top surface of the cover to define a corner at an intersection between the top of the plurality of knurls and a sidewall of the skirt. A score is provided adjacent the corner to provide a flex point for the closure.

In yet another embodiment, the closure includes a cap having a cover and a skirt. A plug and a rudder are provided and depending from an underside of the cover. The tip of the rudder extends a distance below the underside of the cover to prevent fluttering of the lightweight closure during installation on the bottle.

Other embodiments, which include some combination of the features discussed above and below and other features which are known in the art, are contemplated as falling within the claims even if such embodiments are not specifically identified and discussed herein.

BRIEF DESCRIPTION OF THE DRAWINGS

These and other features, aspects, objects, and advantages of the embodiments described and claimed herein will become better understood upon consideration of the following detailed description, appended claims, and accompanying drawings where:

FIG. 4 is a first cross-sectional view of the exemplary closure;

FIG. 6 is a cross-section view of a portion of a first alternative exemplary closure for a container;

FIG. 7 is a cross-section view of a portion of a second alternative exemplary closure for a container.

Figure 1:
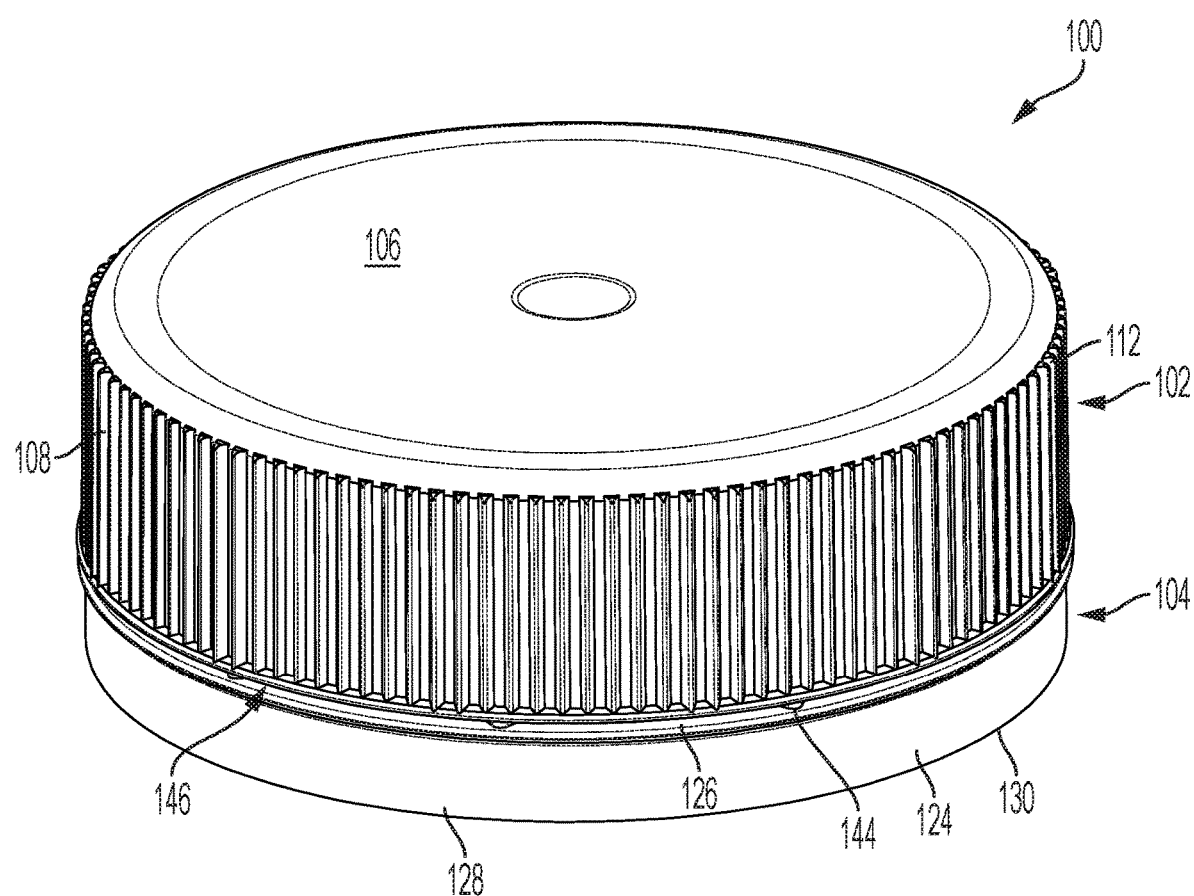
FIG. 1 is a perspective view of an exemplary closure for a container.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the embodiments described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

Figure 2:
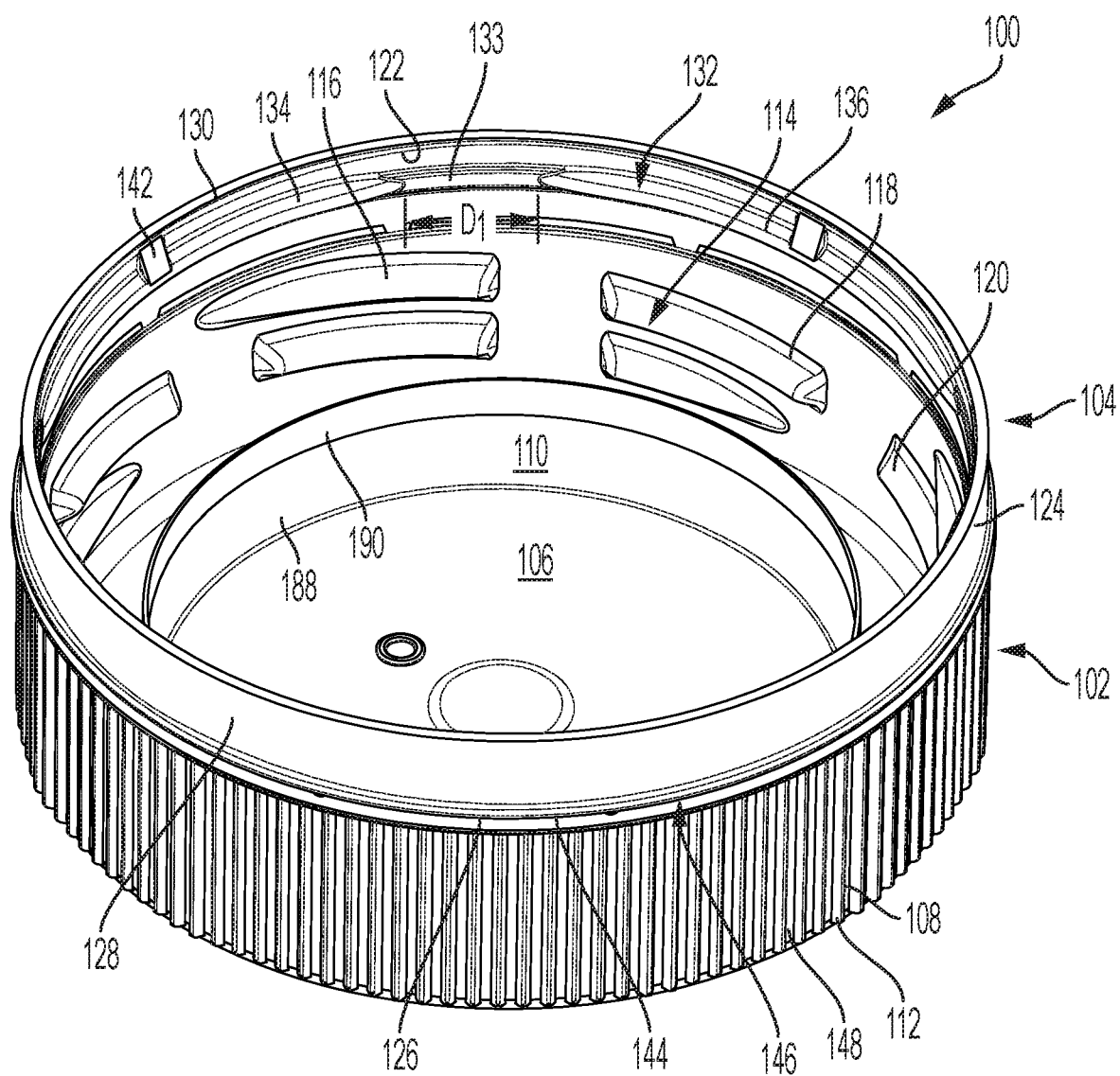
FIG. 2 is a perspective view of the exemplary closure turned upside down.
Figure 3:
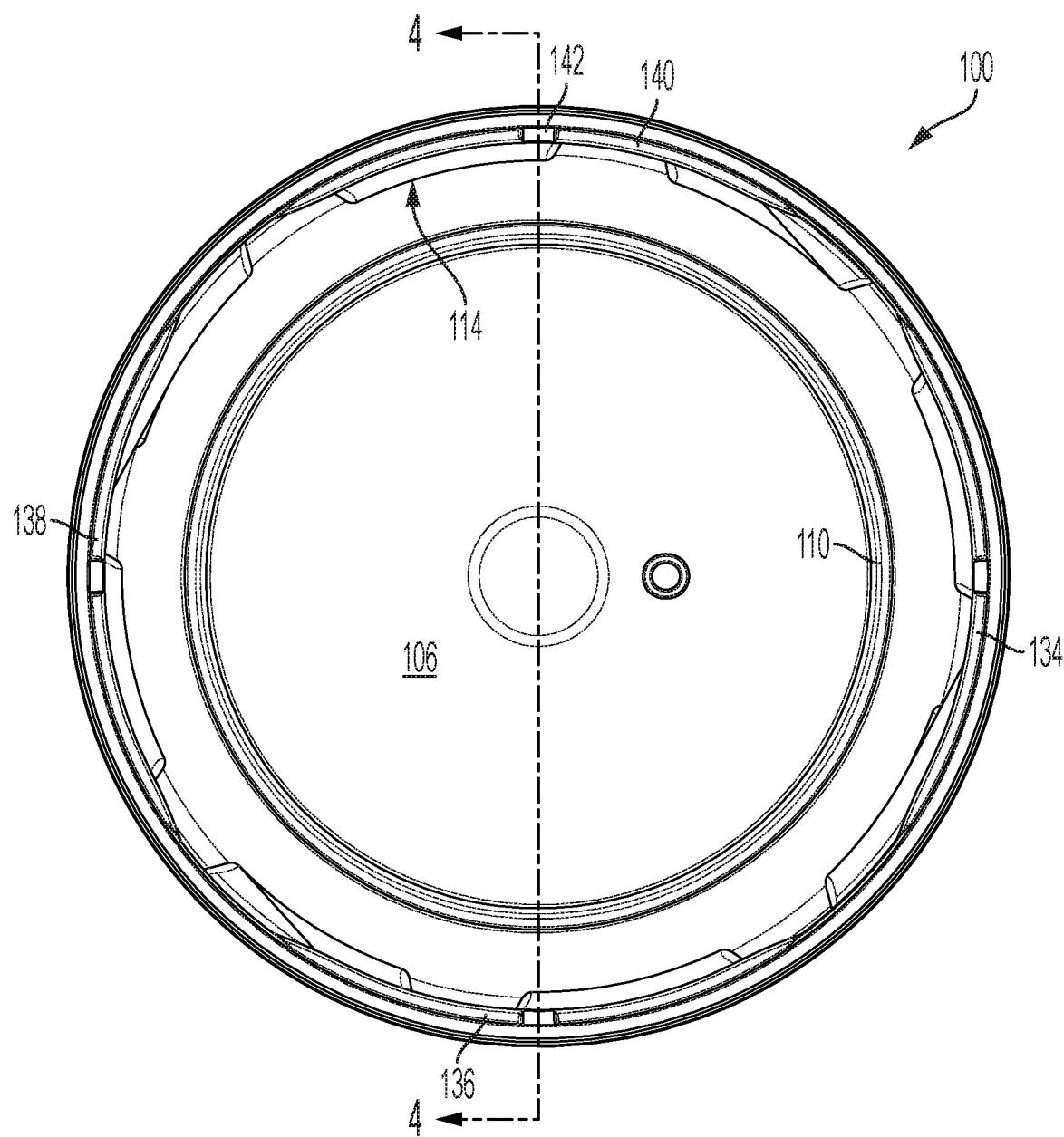
FIG. 3 is a bottom view the exemplary closure.
Figure 5:
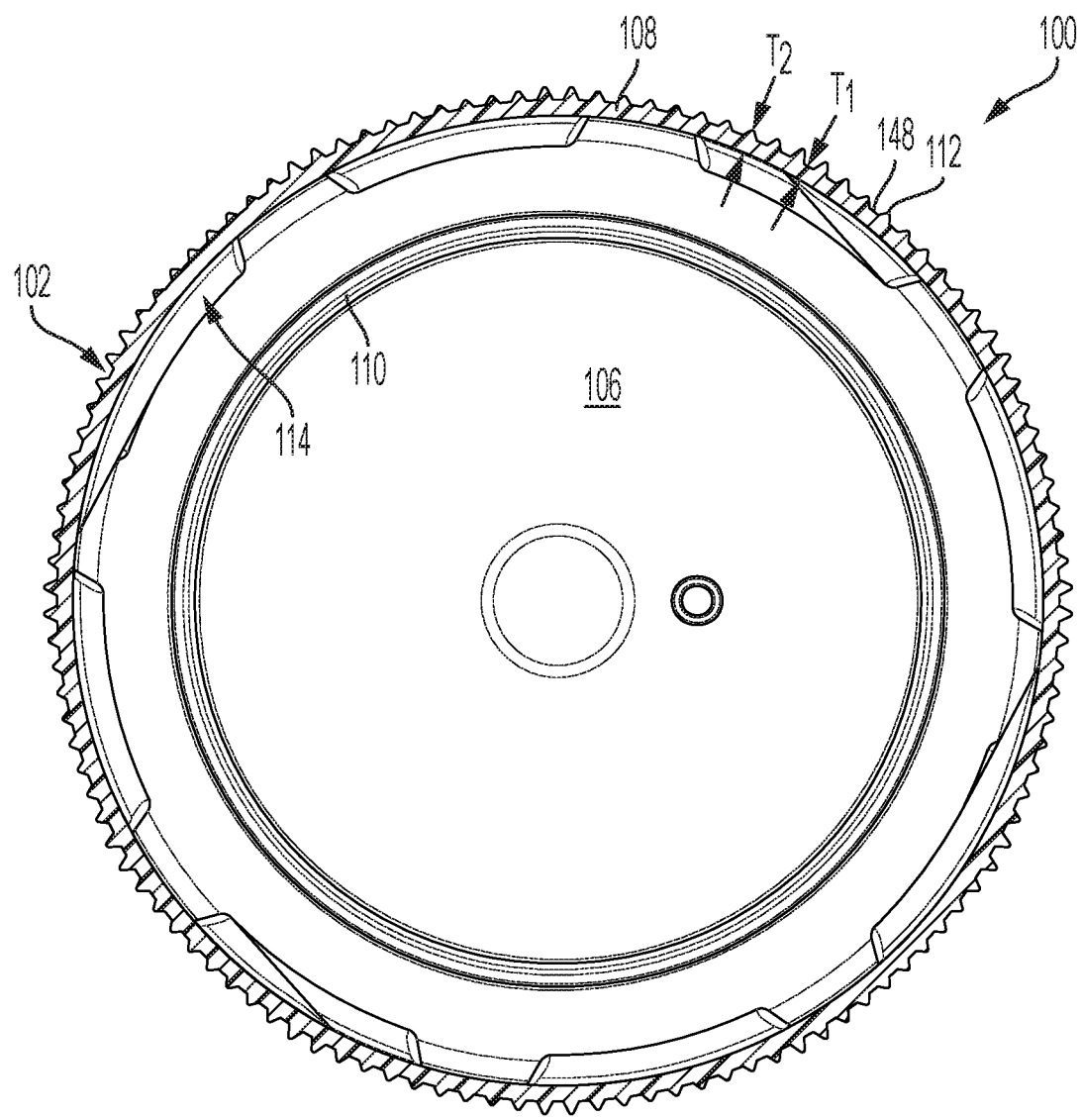
FIG. 5 is a second cross-sectional view of the exemplary closure.

FIGS. 1 and 2 generally depict a closure 100 adapted for use with a container, such as a blow molded milk bottle. FIG. 1 is a perspective view of the closure 100 showing the cap in a use orientation, while FIG. 2 is a perspective view with the closure 100 turned upside down. In one embodiment, the closure 100 includes a cap 102 and a retaining ring 104, each of which is discussed in turn below.

In the embodiment shown, the cap 102 includes a cover 106, a plug 110 extending from the underside of the cover 106 for engagement with an inner diameter surface of a neck portion of a container, a skirt 108, knurls 112 on the outside surface of skirt 108, and a plurality of concentric threads 114, each of which are made up of a plurality of thread segments (e.g., thread segments 116, 118, 120) (shown in FIG. 2) on the inside of the skirt 108 for engagement with corresponding threads on a neck portion of a container (not shown).

As shown, the retaining ring 104 includes an interior surface 122, an exterior surface 124, a top end 126, a body portion 128, a bottom end 130, an inwardly directed bead 132 made up of a plurality of bead segments 134, 136, 138, 140 that and configured to engage with corresponding features on the neck portion of a container, and a corresponding ramp 142 on each bead segment 134, 136, 138, 140. In the embodiment shown, the top end 126 faces the skirt 108 of the cap 102, while the bottom end 130 faces a neck portion of a container.

The top end 126 and the bottom end 130 are connected together by way of the body portion 128. The top end 126 of the retaining ring 104 in turn is connected to the cap 102 by way of a plurality of connecting portions 144. The connecting portions 144 connect the top end 126 to a bottom portion of the skirt 108. As shown in FIG. 1, the top end 126 of the ring 104 is positioned immediately below the slits 146 separating the connecting portions 144.

Preferably, the closure 100 has a unity of threads 114, bead segments 134, 136, 138, 140, and ramps 142. For example, in the depicted embodiment, there are four threads 114, four bead segments 134, 136, 138, 140, and four ramps 142. Having such a unity increases the chances of properly orientation between the closure 100 and the bottle neck during the closure installation process. While there are four of each feature in the depicted embodiment, it is contemplated that there could be two, three, five, or even more of each in alternative embodiments.

In one embodiment, the closure 100 is integrally molded during the manufacturing process such that the retaining ring 104, the cap 102, and all of their associated components or features are molded as part of a single integral piece. In one embodiment, the closure 100 is molded out of high density polypropylene, a common material used in injection molding. Other like materials can be used. However, it is contemplated that various features could be formed after the molding process. For example, while the slits 144 and connecting portions 142 are present when the closure 100 comes out of the mold, it is contemplated, that those features could be created after molding, by intermittingly slitting a bottom portion of skirt 108, leaving behind slits 144 and connecting portions 142. The closure 100 with the cap 102 and the ring 104 can then be attached to a container.

It should be understood that the method by which retaining ring 104 is created is exemplary in nature. Other methods can also be used to create or form retaining ring 104. It should be understood that the embodiment illustrated in FIGS. 1 and 2 is exemplary in nature. As such, cap 100 may include other components or features not shown. For instance, the outside surface of cap 102 may be smooth instead of having knurls 110. Moreover, as discussed in more detail, the closure 100 can embody a combination of additional features that provide added flexibility to the closure 100 or otherwise facilitate easier installation of the closure 100 on a bottle, and those features can be formed during the molding process or may be added after molding, by slitting, scoring, or other form of machine forming.

As shown in the exemplary embodiment illustrated in FIG. 2, the interior surface 116 includes the inwardly directed bead 132. As shown, the bead 132 is an inwardly directed protrusion on the inside surface 122. The inwardly directed bead 132 is formed from a plurality bead segment 134, 136, 138, 140, that are each spaced apart a distance $D_1$. The spaces 133 between the bead segments 134, 136, 138, 140 provide flex points (e.g., hinges or stretch points) where the ring 104 can bend, flex, and/or stretch when the closure 100 is installed on a bottle. Preferably, the bead 132 is formed from four segments, as shown, although any number of segments above one will provide similar results.

As also shown in the exemplary embodiment in FIG. 2, the interior surface 116 includes at least one ramp 142 on each bead segment 134, 136, 138, 140, preferably at the center of each bead segment (i.e., the strongest point on the bead segment). The ramps 142 facilitate the installation of the retaining ring 104 to a neck portion of the container, making it easier for the bead (or cap latch) 132 to pass over a corresponding bead (or bottle latch) on the bottle neck. In one embodiment, during installation, the closure 100 is first positioned above the neck portion of the container. Downward axial force is then applied on to the closure 100 such that the closure 100 is pushed down towards the neck portion of the container. The orientation, position, and/or the dimensions of the ramps 142 in connection with the orientation, position, and/or dimensions of the bead 132 reduces the amount of force required to install the closure 100 to a neck portion of a container, and thereby assists in preventing the retaining ring 104, the closure 100, and/or the container from breaking or from bring deformed. Stated in other words, the ramps 142 smooth out the force applied to the closure 100 when installed on a bottle next, and prevents an instantaneous exertion of force on the closure 100. Additionally, the ramp 142 reinforces or supports the bead 132 during removal of the cap 102 after installation of the closure 100 to the neck portion of the container. As such, the ramp 142 reinforces the bead 132 to prevent the bead 132 from bending or giving way to upward force during removal of the cap, and prevents the retaining ring 104 from simply being pulled along with the cap 102 when the cap 102 is removed from the neck portion of the container. In this regard, the orientation, position, and/or dimensions of the ramp 142 also assists in ensuring that the ring 104 is a tamper-evident ring such that connecting portions 144 break when the closure 100 is removed from the container, leaving behind the ring closure 100 on the neck portion of the container.

As also shown in the exemplary embodiment in FIGS. 1 and 6, the skirt 108 is provided with a thin wall to improve the flexibility and bendability of skirt 108 during the closure installation process. In particular, the cap 102 includes a skirt 108 with a plurality of vertically aligned knurls 112. In one embodiment, the thickness $T_1$ of the skirt 108 in the spaces 148 between the knurls 112 is approximately 0.020 inches, or in the range of approximately 0.018-0.026 inches, while the thickness $T_2$ of the skirt 108 at the knurls 112 is roughly 0.050 inches, although this dimension could vary widely depending upon the number and width of knurls. Preferably, the average thickness of the skirt 108 is equal to or greater than the thickness of the cover 106, for example at the peripheral edge of the cover 106. Stated another way, preferably, the cross-sectional area of the skirt 108 (including the knurls 112) is equal to or greater than the cross-sectional area of the peripheral edge of the cover 106. To allow a sufficient flow of plastic during the molding process, notwithstanding the thin wall segments of skirt 108 between the knurls and to provide a gripping surface, knurls 112 are provided on the outside surface of the skirt 108 to increase the cross-sectional area of the skirt and, thus, to act as flow channels, allowing sufficient plastic to flow into the threads 114 and ring 104. The thin wall of the skirt 108 allows the spaces 148 between the knurls 112 to act as flex points (e.g., hinges or stretch points) for the skirt 108, allowing easier installation of the closure 100 onto a bottle.

As also shown in the exemplary embodiment in FIGS. 2 and 4, the concentric threads 114 are provided in multiple levels (e.g., levels 150, 152, 154 shown in FIG. 4). At each level, the threads 114 are defined by thread segments 116, 118, 120, 121 that are separated by spaces 156. The spaces 156 between thread segments provide flex points (e.g., hinges or stretch points) to provide added flexibility to the cap. At least one, and preferably multiple locations around the circumference of the skirt 108, the spaces 156 between the thread segments and the spaces 133 between the beads are radially aligned (for example, at line $L_1$ in FIG. 4) to provide a flex point that runs from the top of the skirt 108 to the bottom of the ring 104. To prove additional stretch lines that are not necessarily vertical, but can also run at angles, the start and stop radial points of individual thread segments are never both the same at any level 150, 152, 154. See, for example, thread segment 156 at level 150 with start radial point 158 and stop radial point 160, as compared to thread segment 162 are level 152 with start radial point 164 and stop radial point 166. While the stop radial points 160 and 166 are approximately the same, the start radial points 158, 164 are different and therefore define a hinge or stretch line $L_2$ that runs at an angle.

As also shown in the exemplary embodiment in FIG. 4, the cover 106 includes two zones, a first zone 182 inside of the plug 110, and a second zone 184 outside of the plug. In one embodiment, the thickness $T_3$ of the cover 106 in the second zone 184 is approximately 0.018 inches to 0.026 inches and the thickness $T_4$ of the cover 106 in the first zone 182 is approximately 0.001 inches to 0.002 inches thinner than the second zone 184. To improve the flow of plastic during the molding process, while still allowing for a bendable, flexible and stretchable cap, especially near the corner 186 of between the cover 106 and the plug 110, thickness $T_3$ is less than thickness $T_4$.

As also shown in the exemplary embodiment in FIGS. 2 and 4, the plug 110 includes a plug portion 188 that is intended to engage and seal with the inside diameter of the bottle neck, and an extended or rudder portion 190. During the development of the present closure 100, it was found that the thin wall construction of the closure 100 resulted in a light weight cap, so light that, with the use of a conventional plug, the milk foam present in the bottle neck during the closure installation process would cause the closure to flutter before the threads on the closure would engage with the threads on the bottle neck. The use of the presently disclosed, elongated plug 110 with the rudder portion 190, solved the fluttering problem. In addition, it was found that better performance could be had by decreasing the interference between the outer diameter of the plug 110 from a conventional 12-15 thousandths of an inch to approximately 4-5 thousandths of an inch. Preferably, the rudder portion 190 depends from the plug portion 188, and has a thickness $T_5$ that is less than the thickness $T_6$ of the plug portion 188. In one embodiment, the thickness $T_6$ of the plug portion 188 may be approximately 0.030 inches, although it may vary plus or minus by 0.005 inches. In addition, preferably, the length of the plug portion 188 may be 0.130 inches and the length of the rudder portion 190 may be approximately 0.060 inches, although both dimensions may vary plus or minus by 0.005 inches. In addition, the outer diameter of the rudder portion 190 is preferably less than both the outer diameter of the plug portion 188 and the inner diameter of the bottle opening. The interface between the plug portion 188 and the rudder portion 190 may be defined by a shoulder, as shown in the figures. However, it is contemplated that the rudder portion 190 could be separate structure from the plug portion 188 wherein the rudder portion 190 would depend directly from the cover 106 and be positioned inside of the plug 110. In either case, in some embodiments, the tip of the rudder portion 190 should extend at least a distance of 0.180 inches from the inside surface 172 of the cover.

As also shown in the exemplary embodiment in FIGS. 1 and 4, the knurls 112 extend from the bottom 168 to the top 170 of the skirt 108, but terminate at or around the bottom 172 of the cover 106 and do not extend to the top 174 of the cover 106. In that respect, the skirt 108, knurls 112, and cover 106 define a corner 176 that acts as a flex point. To accentuate or improve the flexibility of the closure at corner 176, scores 178, 180 (continuous or non-continuous) can be formed during the molding process or by machine after molding on the inside and/or outside of the closure 100, as shown in FIGS. 6-7. It is contemplated that similar scores (continuous or non-continuous) can be placed on the inside or outside surfaces of the closure at any desired flex point, such as spaces 133, spaces 156, line $L_1$, line $L_2$, and corner 186.

Although the embodiments described and claimed herein have been described in considerable detail with reference to certain embodiments, one skilled in the art will appreciate that the embodiments described and claimed herein can be practiced by other than those embodiments, which have been presented for purposes of illustration and not of limitation. Therefore, the spirit and scope of the appended claims should not be limited to the description of the embodiments contained herein.

We claim:

1. A closure for a container, the closure comprising:
   a cap connected to a retaining ring, the cap including a cover and a skirt;
   a plurality of concentric threads being disposed on an inside surface of the skirt, the plurality of threads comprising at least a first thread at a first level and a second thread at a second level that is above the first level, the first thread being comprised of at least a first thread segment separated from a second thread segment by a first space, the second thread being comprised of at least a third thread segment separated from a fourth thread segment by a second space;
   a latch being disposed on an inside surface of the retaining ring, the latch comprising a plurality of latch segments, the plurality of latch segments comprising a first latch segment separated from a second latch segment by a third space; and
   a plurality of knurls being disposed on an outside surface of the skirt, a top of the plurality of knurls being disposed below a top surface of the cover to define a corner at an intersection between the top of the plurality of knurls and a sidewall of the skirt;
   wherein the first space, the second space, and the third space at least partially overlap in along a radial direction of the cap to provide a first flex point for the closure running from the top of the skirt to the bottom of the retaining ring;
   wherein a score is present adjacent the corner to provide a second flex point for the closure.

2. The closure of claim 1, wherein the plurality of knurls are vertically aligned and horizontally spaced outwardly extending the outer surface of the skirt, wherein a space between adjacent knurls defines the second flex point.

3. The closure of claim 2, wherein:
   the first thread segment has a first start point and a first stop point, the third thread segment having a second start point and a second stop point;
   wherein the third thread segment is positioned above and at least partially overlaps the first thread segment along a radial of the cap, and wherein at least one of the first start point and the first stop point are at a different radial than the second start point and the second stop point, respectively.

4. The closure of claim 1, wherein:
   a plug and a rudder both depend from an underside of the cover; and, a tip of the rudder extends a distance of at least 0.180 inches from the underside of the cover.

5. A closure for a container, the closure comprising:
   a cap including a cover and a skirt;
   a plurality of concentric threads being disposed on an inside surface of the skirt, the plurality of threads comprising at least a first thread at a first level and a second thread at a second level that is above the first level, the first thread being comprised of at least a first thread segment having a first start point and a first stop point, the second thread being comprised of at least a second thread segment having a second start point and a second stop point; and
   a plurality of knurls being disposed on an outside surface of the skirt, a top of the plurality of knurls being disposed below a top surface of the cover to define a corner at an intersection between the top of the plurality of knurls and a sidewall of the skirt; and, and spaces between the first thread segment and the second thread segment provide a first flex point;
   wherein the second thread segment is positioned above and at least partially overlaps the first thread segment along a radial direction of the cap, and wherein at least one of the first start point and the first stop point are at a different radial point than the second start point and the second stop point, respectively, and spaces between the first thread segment and the second thread segment provide a first flex point;
   wherein a score is present adjacent the corner to provide a second flex point for the closure.

6. The closure of claim 5, wherein the score is disposed on an outside surface of the skirt.

7. The closure of claim 5, wherein the score is disposed on an inside surface of the skirt.

8. The closure of claim 5, wherein the score extends around the periphery of the skirt.

9. The closure of claim 8, wherein the score is continuous.

10. The closure of claim 8, wherein the score is discontinuous.

* * * * *